United States Patent [19]

Sulzbacher

[11] 4,380,469
[45] Apr. 19, 1983

[54] PROCESS AND APPARATUS FOR CONTINUOUSLY REDUCING AND MELTING METAL OXIDES AND/OR PRE-REDUCED METALLIC MATERIALS

[75] Inventor: Horst Sulzbacher, Dirnböckweg, Austria

[73] Assignee: Voest-Alpine Aktiengesellschaft, Vienna, Austria

[21] Appl. No.: 293,209

[22] PCT Filed: Dec. 17, 1980

[86] PCT No.: PCT/AT80/00036

§ 371 Date: Aug. 12, 1981

§ 102(e) Date: Aug. 12, 1981

[87] PCT Pub. No.: WO81/01715

PCT Pub. Date: Jun. 25, 1981

[30] Foreign Application Priority Data

Dec. 18, 1979 [AT] Austria ................................ 7981/79

[51] Int. Cl.³ .............................................. C21C 7/00
[52] U.S. Cl. ........................................ 75/38; 75/48; 266/168; 266/176
[58] Field of Search ................. 75/38, 48; 266/168, 266/176, 178, 186, 166

[56] References Cited

U.S. PATENT DOCUMENTS

| | | | |
|---|---|---|---|
| 3,063,826 | 11/1962 | Cavanagh | 75/38 |
| 3,539,336 | 11/1970 | Urich | 266/178 |
| 3,663,202 | 5/1971 | Ruter | 75/38 |
| 4,083,715 | 4/1978 | Langhammer | 75/445 |
| 4,116,678 | 9/1978 | Lafont | 75/38 |

*Primary Examiner*—P. D. Rosenberg
*Attorney, Agent, or Firm*—Cushman, Darby & Cushman

[57] ABSTRACT

For continuously reducing and melting metal oxides and, respectively, metallic materials pre-reduced to a large extent, fuels are completely burned within a melting receptacle. The melting receptacle (8) is tightly passing at its upper side into at least one supply space (7) essentially extending in horizontal direction. The effluent gases of the complete combustion within the melting receptacle (8), are emerging via the supply space (7), coal dust being supplied via a coal dust nozzle (15) to the hot combustion gases immediately prior to entering the supply space (7). The hot combustion gases essentially consisting of $CO_2$ and $H_2O$ are at least partially converted to $CO$ and $H_2$ and cooled and are passed with a temperature exceeding 800° C. within the supply space (7) in countercurrent to the charge material (10) to be supplied into the melting receptacle (8). While passing through the charge material (10), the combustion gases supplied with a temperature exceeding 800° C. are transmitting their heat to the charge material, noting that when using a charge material of metal oxides an extensive pre-reduction can be effected within the supply space (7). While passing through the charge material, the hot combustion gases are cooled and the hot combustion gases are discharged with temperatures exceeding 100° C., preferably with a temperature of approximately 150° C., for avoiding condensation of water within the charge material.

9 Claims, 1 Drawing Figure

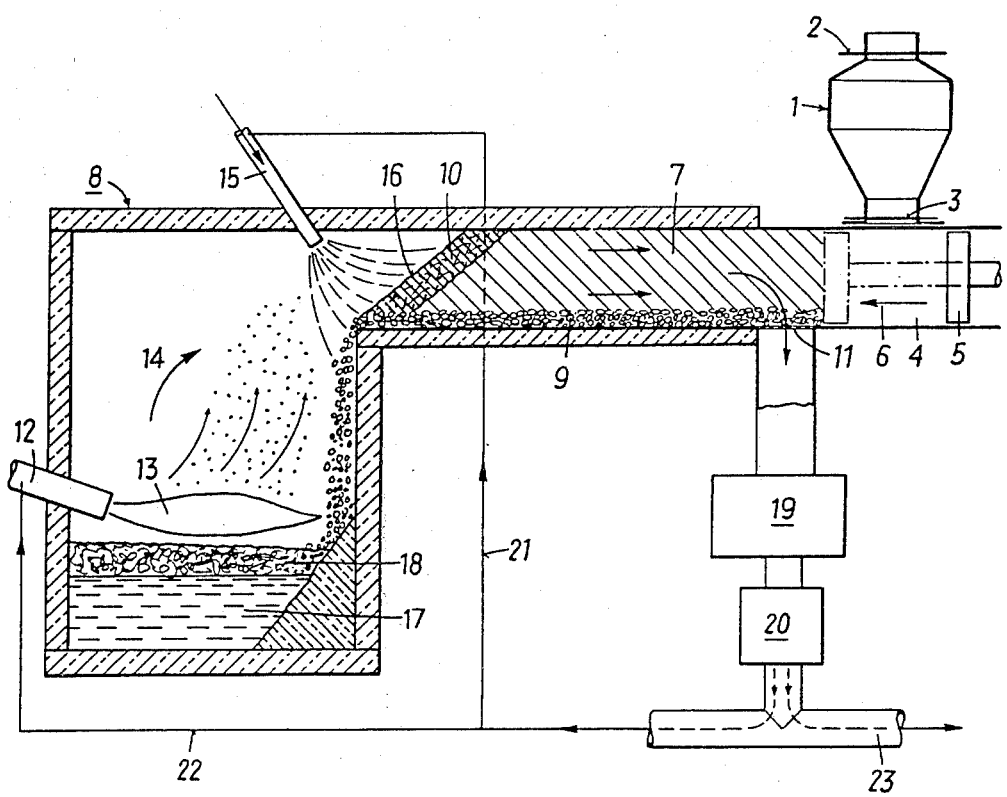

PROCESS AND APPARATUS FOR CONTINUOUSLY REDUCING AND MELTING METAL OXIDES AND/OR PRE-REDUCED METALLIC MATERIALS

The present invention refers to a process for continuously reducing and melting a charge of metal oxides, particularly ores and, respectively, metallic materials pre-reduced to a large extent, particularly iron sponge, if desired together with additives such as slag formers, fluxes and carbon carriers, as well as to an apparatus for performing this process.

Direct reduction processes are of considerable importance for steel production beside refining processes subsequently to a blast furnace process. With such direct reduction processes, iron sponge is, as a rule, produced in a shaft furnace or rotary kiln, which iron sponge can subsequently processed to steel by melting and alloying. It is a considerable advantage of such direct reduction processes over the blast furnace process that they are not dependent on energy carriers formed of high-grade fuels such as coke. Processing of ores by direct reduction processes is, however, disadvantageous over the combination of a blast furnace process and subsequent refining process on account of the comparatively higher total energy requirement. A drawback of the known reductive melting processes resides in the circumstance that on account of the relatively low energy produced during partial combustion effected with an excess of carbon either only coals having a high carbon content and a low content in water and volatile constituents can be used or the missing melting and reduction heat must be compensated for by supplying electrical energy.

A further disadvantageous property of these processes resides in that the effluent gases are flowing out of the melting receptacles with temperatures within the range of 1,000° and 1,800° C. and require a high expenditure in apparatuses for subsequent purification and utilisation, respectively.

For melting and finally reducing lumpy iron sponge within a melting receptacle it is possible to proceed such that coal dust and oxygen are subjected to partial combustion and supply the energy required for melting and reduction. Non-gasified coal particles act as reducing agent and carburizing agent. The gas generated on partial combustion and on direct reduction of the remaining iron oxides, respectively, can, after having been purified and cooled, be used for producing directly reduced iron (iron sponge) within a separated reducing shaft. The metallized product from this gas reduction aggregate shall have a very low content in residual oxygen and be supplied into the melting receptacle with a temperature between 750° and 850° C. Pre-reduced fine ore can, however, also be introduced into the melting receptacle together with coal dust, the iron source being molten and the remaining oxides being directly reduced within the melting receptacle. The gas thus formed and containing CO and $H_2$ is either burned with oxygen to $CO_2$ and $H_2O$ when leaving the melting receptacle or is used, after having been cooled and purified, for pre-reducing fine ore in a separate fluidized bed plant. In view of no or only little melting and reducing heat being produced during the combustion with this processes, it is necessary to supply a major portion of the required energy by means of electric current. It is only by this additional supply of energy that it becomes possible to achieve the high energy concentration required with these processes.

All reductive melting processes have an essentially higher total energy consumption than the blast furnace process but also the net energy requirement (after deducting the gas credit) is, in comparison thereto, distinctly higher because the amount of direct reduction is higher or because utilisation of the chemical heat and of the sensible heat of the gas is not as ideal as with the usual pig iron technology. Additionally there arise nearly in all cases problems on account of the ash produced when burning coal because this ash is present within the effluent gas in relatively great amount and this ash is softening at the high temperatures.

The invention now aims at providing a process of the kind initially defined, in which also low-grade fuels can be used and in which the energy supplied can be utilized to a high extent. Simultaneously, the effluent gas problems becoming greater when using low-grade fuels shall reliably be coped with. The process shall furthermore be suitable for melting also high-melting metals and alloys such as FeMn, FeCr or FeSi as well as pre-reduced manganese ore or the like. For solving this task, the invention essentially consists in that the charge is heated to a temperature above its melting temperature within a melting receptacle by complete combustion of fuels, particularly solid fuels such as pit coal dust or brown coal dust, in that carbon, particularly coal dust, is supplied to the hot combustion gases thereby partially converting to CO and $H_2$ and cooling the hot combustion gases essentially consisting of $CO_2$ and $H_2O$, in that this conversion product is with temperatures exceeding 800° C. passed in countercurrent through the charge to be supplied to the melting receptacle and is then drawn off with temperatures exceeding 100° C., preferably with a temperature of approximately 150° C., dried and purified and in that, preferably, the dried and purified gas is at least partially supplied to the burners within the melting receptacle and, respectively, or is supplied to the hot effluent gases together with carbon. For making possible an economic use of solid low-grade fuels for reductively melting and, respectively, for melting of pre-reduced metallic materials, the energy of the hot combustion gases must ingeniously made be use of. The combustion gases leave the melting receptacle frequently with a temperature within the range of 1,300° to 2,000° C. in dependence on the selected fuels and the direct utilisation of the sensible heat of these combustion gases for pre-heating of pre-reduced metallic materials would result in superficially melting and thus in the formation of a tight layer being impermeable for gases. Furthermore, iron sponge has in the rule a carbon content insufficient for obtaining a carbon content of approximately 3 to 4% of the pig iron obtained by melting the iron sponge. In view of this starting condition, there is, according to the invention, proposed to add carbon to the hot combustion gases, so that the strongly endothermic reactions proceeding according to the equations

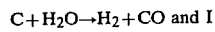

$$C + H_2O \rightarrow H_2 + CO \text{ and I}$$

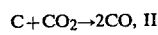

$$C + CO_2 \rightarrow 2CO, \text{ II}$$

result, on the one hand, in cooling the combustion gases to for example approximately 800° to 1,000° C. when using materials pre-reduced to large extent and, respectively, to approximately 1,000° to 1,400° C. when using metal oxides, particularly ores, and, respectively, a charge containing additives and, on the other hand, in providing a reducing atmosphere, the chemical energy of which can, for example, be utilized by using the gas as a reducing agent or as an energy source. The sensible heat is thus utilized for supplying chemical energy, and by cooling the gases the formation of a gas-impermeable layer when charging pre-reduced metallic materials is avoided. The minimum temperature of 800° C. makes sure that the materials to be molten are sufficiently pre-heated and by blowing onto excess carbon the desired degree of carburisation can be obtained in a simple manner. For this purpose carbon is, according to the invention, supplied to the hot combustion gases in form of brown coal dust free of humidity to a large extent or in form of charcoal dust. The hot combustion gases having been reacted according to the above equations I and II and having been cooled are now passed through the charge to be supplied to the melting receptacle thereby transmitting their sensible heat to the charge or supplied material. Simultaneously, a higher degree of metallisation is obtained in view of the reducing properties of this gas, for example when using as a charge iron ore of low degree of metallisation or a mixture of iron sponge and ore. The charge to be supplied has a filtering action and coals rich in fly ash can be burned within the melting receptacle and the major part of harmful materials can be filtered by the charge. The effluent gases cooled by the charge are, according to the invention, discharged, after having passed through the charge, with a temperature exceeding 100° C., preferably a temperature of approximately 150° C., for avoiding condensation of steam within the charge.

The combustion gas discharged with temperatures of approximately of 150° C. can in a simple manner, according to the invention, be used, after further cooling and removal of water in gas purifyers, as a carrier gas for blowing carbon into the hot combustion gases. In this manner, supply of air and thus an oxidising atmosphere is avoided.

According to the invention, the combustion gases are cooled by the endothermic reaction proceeding according to the equations I and II by blowing-in carbon down to 800° to 1,000° C. from temperatures within the range of 1,100° and 1,600° C., particularly 1,300° to 1,500° C., when melting a charge pre-reduced to a large extent or down to temperatures from 1,000° to 1,400° C. from temperatures within the range of 1,700° to 2,000° C. when reducing and melting a charge containing metal oxid. The combustion gases cooled down in accordance with the respective purpose of utilisation are now passed through the charged materials.

Carbon is, in an advantageous manner, supplied to the hot combustion gases, in an excess amount suitable for carburizing the bath, noting that the gas having been discharged after having passed through the charged materials to be supplied to the melting receptacle and having been purified can be used as a carrier gas for blowing carbon into the hot combustion gases. For overcoming the relatively high pressure loss within the charge supplying equipment it is preferably proceeded such that oxygen and fuel are supplied by nozzles into the melting receptacle with super-atmospheric pressure and, respectively, or, that at the supply end of the supply space for the charge material sub-atmospheric pressure is applied.

The inventive apparatus for performing this process according to the invention has a melting receptacle and at least one burner opening into this melting receptacle and is essentially characterized in that the melting receptacle is at its upper end tightly passing over into at least one supply space essentially extending in horizontal direction and having a supply equipment for the charge materials connected thereto, in that a nozzle for introducing carbon by blowing is arranged at the connecting area between the supply space and the melting receptacle and in that at the other end of the supply space a gas exit opening is provided to which a gas purifying and drying device and, preferably, a suction blower is connected, said suction blower being in connection with conduits leading to the nozzle for the coal dust and, respectively, or the burners of the melting receptacle. The supply space essentially extending in horizontal direction is, in this case, formed as a tubular shaft, the axis of which is perpendicularly extending relative to the axis of the melting receptacle. This tubular shaft can, in a simple manner, be charged according to the principle of a pusher-type furnace, what means that a hydraulically activated piston is shifting the charge, for example the iron sponge or the metal oxides, for a certain stroke in forward direction with low speed, so that a small amount of material is continuously falling into the melt at that end of the tubular shaft which is located adjacent the melting receptacle. After a certain time interval, the piston is retracted and the opening thus given free is again filled with material. In this case, lime stone can first be supplied acting as some sort of grate layer and then the charge, for example iron sponge, can be supplied, so that gas-flow through the charge is improved.

The effluent gas completely burned above the surface of the molten bath and consisting of $CO_2$ and $H_2O$ is radiating part of its heat onto the bath of slag and pig iron located below and is streaming off in upward direction. Before the gas is leaving the melting space closed on top via one ore more supply spaces extending in essentially horizontal direction and being filled with charge material the gas is turbulently mixed with the coal dust having a low content in $H_2O$ and volatile constituents and blown into the melting space via a nozzle. The effluent gas is thus endothermically reacted according to the above-mentioned equations I and II so that the temperature of the effluent gas can be lowered in the desired manner. The gas mixed with ash particles and non-gasified carbon is, when leaving the melting receptacle, contacting the charge material within the horizontal supply space, noting that solid and pasty particles are filtered out of the gas and further endothermic reactions are proceeding because, beside a gasification, already the direct reduction ($FeO + C \rightarrow Fe + CO$) is proceeding. It is assumed that by these reactions consuming a great amount of heat energy, the gas temperature is rapidly lowered to 800° C. within the charge material. If the charged material is formed of a furnace burden and, respectively metal oxides, an indirect reduction is effected within the supply equipment beside a pre-heating of the charge, which can consist of lumpy ore and additives.

The length of the horizontal shaft must be calculated such that the gas produced transmits the major part of its sensible heat to the charge conveiyed in countercurrent thereto and can be sucked out of the shaft with a temperature of approximately 150° C. This temperature can be obtained in a relatively simple manner, because this temperature can be controlled by the shifting speed of the piston, by the amount of fuel and also by the amount of carbon supplied for reacting the hot combustion gases according to the equations I and II. The effluent gas consisting of $H_2$, CO, $H_2O$ and $CO_2$ can, after having been sucked off, be purified, noting that it is possible to wash out of the gas the relatively high amount of $H_2O$ and that also $CO_2$ can be removed as far as this does make sense. The gas sucked off and purified can with pre-heating be recycled to the combustion within the melting receptacle or can be used as a high-quality gas for other gas consumers.

The pre-heated furnace burden falling into the melting receptacle consists of lime stone for slag formation, of non-gasified coal particles for carburizing purposes, of fly ash particles obtained by filtering and of the charge pre-reduced to a large extent, for example iron sponge. The degree of pre-reduction of the material falling into the melting receptacle is dependent on the residence time within the supply equipment and the gas composition after gasification. The smaller is the oxygen content of the metallized product the lower is the specific energy consumption and the higher is the melting power within the melting receptacle. The carbon for carburizing and for direct reduction is primarily supplied via the coal dust nozzle but can also be supplied together with a charge so that the carbon content of the pig iron can adjusted in a relatively simple manner.

In the case that brown coals of low calorific value are used, there exists the possibility that in spite of sufficient melting heat and of high combustion temperature within the melting zone the energy supplied is insufficient to allow the gasification reactions to proceed. For increasing the amount of heat supplied, the gas can be recycled and pre-heated, the coal to be gasified can be pre-heated, the oxygen can be pre-heated and additional energy can be supplied by means of plasma burners for which purpose the purified effluent gas is a excellent carrier. When using bituminous coals of high calorific value and when working with the above-mentioned additional measures it is possible to produce with simultaneous reduction of the requirement in electrical energy and carbon also metals having an essentially higher melting temperature and requiring higher reducing energies than pig iron. FeCr, FeMn and, above all, FeSi (low losses in SiO) are examples for a number of other metals and alloys.

Above all when using low-grade coals, great amounts of gases can be expected. In this case, a plurality of horizontal supply spaces or charging spaces, respectively, can be provided and a plurality of coal dust nozzles can become necessary at the area of transition between the melting receptacle and the supply equipment. In some cases it might be convenient to supply part of the melting and reducing heat in the form of electric energy, in which case plasma torches can advantageously be used for heating the gas passed along a closed circuit. An alternating arrangement of coal dust burners and plasma burners is then to be provided for a corresponding furnace receptacle. It is however also possible to supply into a melting receptacle the required energy by means of electrodes.

The charging tube can in a simple manner be charged by having a closable opening of a burden bunker opening into the working space of the coal shifting piston.

Complete combustion of the fuel with oxygen within the melting receptacle is of essential importance for obtaining the high effluent gas temperatures, because with a partial combustion, for example in the case of carbon, $(C+\frac{1}{2}O_2 \rightarrow CO)$ only 9,600 KJ(kilojoule) are generated per kilograme carbon whereas with a complete combustion $(C+O_2 \rightarrow CO_2)$ 33,200 KJ are generated. It is only with a complete combustion that when using low-grade fuels the high effluent gas temperatures can be obtained which are necessary for the subsequent reaction with simultaneous carburisation of the charged material. After purifying the gas removed from the supply space of the melting receptacle, a pure gas can be obtained after removal of the water by washing the gas in a gas washing plant, noting that said pure gas can, for example, be added as a high-grade fuel gas to the solid fuels for burning in the burners of the melting receptacle.

In the following, the invention is further described with reference to an embodiment of a reductive melting plant according to the invention schematically shown in the drawing.

In the drawing, 1 is a burden bunker being closable at its top and at its bottom by a slide 2 and 3. The lower end of the burden bunker 1 is opening into the working space of a pushing piston 5, which, when being moved in direction of the arrow 6, is introducing into the supply space 7 of the melting receptacle 8 the charge material, for example iron sponge or iron oxide and lime stone, coming from the burden bunker. The supply space 7 has a grate layer 9 of lime stone and above this layer there is located the charge 10. A discharge conduit 11 is connected to that end of the supply space 7 which is adjacent the piston 5.

Bituminous coal or brown coal is in form of dust together with oxygen supplied into the melting receptacle 8 through a burner 12, the flame being designated 13. The effluent gases, essentially containing $CO_2$ and $H_2O$ as well CO and $H_2$ generated by dissociation on ground of the high combustion temperatures of approximately 1,900° C. are upwardly streaming in direction of the arrow 14 together with fly ash. Coal dust is introduced by blowing at the area of transition to the supply space 7 via a coal dust nozzle 15, thereby cooling the effluent gases from the combustion to a temperature between 800° and 1,400° C. and partially reacting these gases to CO and $H_2$. Part of the coal dust is also reaching the surface 16 of the charge and arrives together with this charge into the melt 17. A slag layer 18 is floating on this melt 17. The cooled and reacted waste gases from the combustion are now passed through the charge 10 and extracted with temperatures of approximately 150° C. through the discharge conduit 11 and then passed to a gas purification and drying stage 19. The purified and dried effluent gases are by means of a suction blower 20 supplied via conduits 21 to the coal dust nozzle 15 as a carrier gas and via a conduit 20 to the burner 12 as a fuel gas. Via a conduit 23, this gas can be supplied also to further gas consumers. While even brown coal rich in water can be utilized in the burner 12 it is to recommend to supply to the coal dust nozzles 15 carbon carriers of higher quality, particularly brown coal dried to a large extent and in powder form or charcoal dust, for obtaining the desired rapid conversion of the effluent gases.

In the following, the invention is further explained with reference to investigations concerning the energy consumption when working according to the process according to the invention.

Example 1: Melting of pre-reduced material.

Presuppositions: Use of a coal having a calorific value of 8,400 KJ/cg (kilojoule per kilogram) for melting and of charcoal for high temperature gasification.

Analysis of the brown coal: 34% by weight carbon, 15% by weight volatile constituents (4% by weight $H_2$), 3% by weight ash, 48% by weight humidity.

Analysis of the charcoal: 72% by weight carbon, 15% volatile constituents (4% by weight $H_2$), 1% by weight ash, 8% by weight humidity.

The energy requirement of melting of pig iron and slag and for reducing from the burden (directly reduced iron (DRI)+lime stone) is approximately 2.1 GJ/t pig iron (PI) (gigajoule per ton pig iron), while the temperature of the pig iron shall be 1,500° C. and the heat loss shall be approximately 0.4 GJ/t pig iron. With complete combustion of the brown coal with oxygen, the theoretical combustion temperature is approximately 2,100° C., but in practice the combustion temperature will be approximately 1,900° C. Dissociation of $H_2O$ and $CO_2$ always occurs with high flame temperatures but is neglected in the calculation because this calculation would otherwise become too complicated. The amount of gas generated when completely burning 1 kg of brown coal having the above-mentioned analysis with oxygen is 1.69 $Nm^3$ ($m^3$ under normal conditions) (37% by volume $CO_2$, 63% by volume $H_2O$). The amount of oxygen required therefor is 0.8 $Nm^3 O_2$/kg coal.

Energy requirement for melting pig iron and slag, reduction and furnace losses: The energy requirement for heating the iron sponge to temperatures of 800° to 1,500° C., for the reduction and for slag melting and for carburizing is approximately 1.3 GJ/t PI (gigajoule per metric ton pig iron) and for furnace losses assumed to be approximately 0.4 GJ/t PI is thus approximately 1.7 GJ/t PI as total energy requirement for melting within the melting receptacle. With the supposition that 50% of the heat energy introduced is consumed within the melting receptacle (melting, reducing, heat losses) and the remainder is present in the effluent gas as sensible heat, the total amount of energy to be supplied in the form of brown coal is 3.4 GJ/t PI, corresponding to 400 kg brown coal having a net calorific power $H_n$ of 8,400 KJ (kilojoule) (2,000 kcal/kg) (kilocalories per kilogram).

Amount of effluent gas produced on combustion: 680 $Nm^3$(252 $Nm^3 CO_2$, 428 $Nm^3 H_2O$).

The assumed gas temperature prior to high temperature gasification is approximately 1,250° C.

High temperature gasification: For simplification it is assumed that the sensible heat of 6 $Nm^3 CO_2$ at 1,250° C. supplies the reaction heat for the Boudouard-reaction ($C + CO_2 \rightarrow 2CO$) and that therefrom a gas containing 5 $Nm^3 CO_2$ and 2 $Nm^3 CO$ is formed at 800° C. With steam ($H_2O + C \rightarrow H_2 + CO$) there result from 6.5 $Nm^3 H_2O$ 5.5 $Nm^3 H_2O$ and 1 $Nm^3 CO + 1$ $Nm^3 H_2$ during gasification. The gas is obtained in an amount of 790 $Nm^3$(45% by volume $H_2O$, 28% by volume $CO_2$, 19% CO, 8% by volume $H_2$). The sensible heat of this gas at 800° C. is 1.4 GJ/$Nm^3$.

There are thus at disposal 1.2 GJ (sensible heat at 800° C. minus sensible heat at 150° C.) for the amount of furnace burden required per metric ton of pig iron, a sufficient amount of heat for heating the furnace burden to 800° C.

Assuming that the steam portion of the gas produced is washed out in the gas washer, the composition of the washed gas is—with an amount of 426 $Nm^3$—49% by volume $CO_2$, 35% by volume CO, 16% by volume $H_2$. $H_n = 6,200$ KJ/$Nm^3$ For carburizing the pig iron and for gasification, the following amount of carbon is required:

For carburisation: 30 kg/t PI (the remainder of approximately 1% by weight is present within the iron sponge).

For gasification:

| | |
|---|---|
| (C + $CO_2 \rightarrow 2$ CO) 42 $Nm^3 CO_2$, 0,53 kg C/$Nm^3 CO_2$ = 22 kg C, ($H_2O$ + C$\rightarrow H_2$ + CO) 66 $Nm^3 H_2O$, 0,53 kg C/$Nm^3 H_2O$ = 35 kg C, | |
| carbon for gasification and carburisation | 87 kg/t PI, |
| requirement in coal to be blown in via nozzles (for example charcoal) | 120 kg/t PI. |
| Energy balance per metric ton pig iron: | |
| 400 kg brown coal ($H_n$ 8 400 KJ/kg) | 3.36 GJ |
| 120 kg charcoal ($H_n$ 27 700 KJ/kg) | 3.32 GJ |
| 320 $Nm^3$ Oxygen (0.7 kWh/$Nm^3$) | 0.81 GJ |
| energy supplied | 7.49 GJ |
| sensible heat of 1 t pig iron | 1.25 GJ |
| 40 kg carbon in the pig iron (H = 33 500 KJ) | 1.34 GJ |
| 200 kg slag | 0.33 GJ |
| 426 $Nm^3$ gas ($Hn$ = 6 200 KJ/$Nm^3$) | 2.67 GJ |
| energy supplied | 5.59 GJ |
| efficiency: 0.74% when utilizing the gas formed. | |

When reusing the gas, the theoretical energy requirement is 1.9 KJ/t PI, i.e. approximately 530 kWh/t PI (kilowatt-hours per metric ton pig iron). In case the gas formed is flared, the energy consumption is 4.57 GJ = 1,260 kWh/t PI.

For producing one metric ton steel from iron sponge within an electric arc furnace, there is required an amount of energy of approximately 600 kWh in the form of electric current. If this requirement in electric current is calculated on the basis of primary energy, i.e. brown coal for producing electric current, then the energy requirement is approximately 1,500 kWh/t raw steel (RSt). In view of the energy consumption of oxygen refining processes not exceeding 100 kWh/t raw steel, the production of raw steel according to the process described would be competetive with the production of steel from iron sponge in an electric arc furnace even when not utilizing the gas produced (1,260 kWh/t PI×0.9 t PI/t RSt+100 kWh/t RSt = 1,234 kWh/t RSt).

Example 2: Production of molten pig iron from iron ore by using bituminous coal having a net calorific power of $H_n = 25,000$ KJ/kg for producing the melting and reduction energy and by using brown coal coke for gasification, carburisation and direct reduction.

Reduction via the gaseous phase (indirect reduction) = 60%

Reduction via solid carbon (direct reduction) = 40%.

Analysis of the bituminous coal: 60% by weight carbon, 25% by weight volatile constituents, 9% by weight ash, 5% by weight $H_2O$.

Analysis of the brown coal coke: 86.5% by weight carbon, 3% by weight volatile constituents, 3% by weight $H_2O$, 6.5% by weight ash.

| | |
|---|---|
| Energy requirement per metric ton of pig iron for melting, reducing and heat losses within the melting zone | 2.9 GJ |
| Energy consumption for pre-heating the materials, for reduction by hydrogen and for losses within the horizontal tube | 1.3 GJ |
| Losses in sensible heat of the effluent | |

| -continued | |
|---|---|
| gases (200° C.) | 0.4 GJ |
| Total energy requirement for melting | 4.6 GJ |

It is pre-supposed that 80% of the effluent gas produced by combustion of 300 kg bituminous coal and consisting of 70% by volume $CO_2$ and of 30% by volume $H_2O$ is reacted to CO and $H_2$ by brown coal coke introduced via nozzles.

| | |
|---|---|
| Amount of effluent gas obtained by consumption of 300 kg bituminous coal | 534 $Nm^3$ effluent gas |
| Energy consumption for reforming 80% of the gas | 6 900 KJ/$Nm^3$ = 2.9 GJ/t PI effluent gas |
| Total energy requirement for melting, reducing, reforming and heat losses | 4.6 + 2.9 GJ = 7.5 GJ/t PI |
| Energy supplied by combustion of 300 kg bituminous coal | 25 000 KJ/kg × 300 kg pitcoal = 7.5 GJ/t PI |
| Consumption of brown coal coke for: | |
| reforming | 270 kg |
| direct reduction | 140 kg |
| carburization | 50 kg |
| total consumption | 460 kg/t PI |

| Total compositions: | | | | | |
|---|---|---|---|---|---|
| in the melting receptacle | | after gasification | | behind gas washer | |
| % | $Nm^3$/t pig iron (PI) | % | $Nm^3$/t pig iron (PI) | % | $Nm^3$/t pig iron (PI) |
| CO | 30 | 224 | 80 | 950 | 57 | 640 |
| $H_2$ | | | 11 | 128 | 9 | 100 |
| $CO_2$ | 50 | 374 | 6 | 75 | 34 | 380 |
| $H_2O$ | 20 | 160 | 3 | 32 | | |
| | | 758 $Nm^3$ | | 1135 $Nm^3$ | | 1120 $Nm^3$ |

| | |
|---|---|
| $H_n$ of the gas behind the gas washer | 8 100 KJ/$Nm^3$ |
| total calorific value of 1120 $Nm^3$ effluent gas | 9.1 GJ/t pig iron (PI) |
| energy consumption for 1 t pig iron from ore: | |
| 300 kg bituminous coal (25 000 KJoule/kg) | 7.5 GJ |
| 460 kg brown coal coke (29 000 KJoule/kg) | 13.5 GJ |
| 393 $Nm^3$ oxygen (0.7 kWh) | 1.0 GJ |
| sum | 22.0 GJ |
| credited energy for chemical heat in the effluent gas | −9.1 GJ |
| net energy consumption | 12.9 GJ |

The net energy consumption of an up-to-date blast furnace is, not considering the energy consumptions for coke production and agglomeration, approximately 13.2 GJ/t PI(gigajoule per metric ton pig iron).

It is characteristic for the process according to the invention that the metallurgical process becomes well supervisible and well controllable. Emissions of harmful matter can substantially be reduced by the filtering action of iron sponge and simultaneously low-grade fuel such as brown coal is converted into a high-grade energy source (gas). Brown coals of high water content can be used and the process according to the invention can in a simple manner be combined with a process for direct reduction of solid material. Also utilisation of coals rich in ash is possible without problems because the ash particles are filtered from the effluent gas by the iron sponge and become molten within the slag. No problems whatsoever arise on gas purification by tar or other liquid hydrocarbons.

The process according to the invention can be performed in a continuous manner and the principle of the process can in a simple manner also be applied when producing molten ferroalloys and non-ferrous metals. Within the supply space of the melting receptacle there exists the possibility to perform reduction by gases so that iron sponge of low degree of metallisation or mixtures of iron sponge and ore can be worked up.

I claim:

1. A process for continuously reducing and melting solid materials containing metal oxides comprising: continuously supplying a charge of the material to a melting receptacle; heating the supplied charge to a temperature above its melting temperature in the melting receptacle by means of a burner which effects combustion within the receptacle of a fuel which upon combustion produces effluent gas containing essentially carbon dioxide and water vapor at a temperature sufficiently high that the effluent gas can react with carbon; supplying carbon in particulate form to the hot effluent gas thereby forming carbon monoxide and hydrogen by reaction of the carbon with the carbon dioxide and with the water vapor; passing the product gas resulting from the reaction at a temperature exceeding 800° C. in countercurrent flow with the charge of material being supplied to the melting receptacle in a manner to heat the charge of material and to cool the product gas to a temperature exceeding 100° C.

2. A process as in claim 1 including passing at least a portion of the product gas to said burner.

3. A process as in claim 1 including the step of passing at least a portion of the product gas into the effluent gas with the particulate carbon.

4. A process as in claim 1, 2 or 3 wherein the carbon in particulate form is coal dust.

5. A process as in claim 4 wherein the coal dust is brown coal dust free of water to a large extent.

6. A process as in claim 1, 2 or 3 wherein the carbon in particulate form is charcoal dust.

7. A process as in claim 1, 2 or 3 wherein the fuel is selected from the group consisting of pit coal dust or brown coal dust.

8. A process as in claim 1, 2 or 3 wherein the particulate carbon is supplied to the effluent gas in an excess amount sufficient for carburizing the melt.

9. A process as in claim 3 wherein the cooled product gas serves as a carrier gas for carrying the particulate carbon into the effluent gas.

* * * * *